Aug. 7, 1934.     H. D. CHURCH     1,969,690
LUBRICATING ARRANGEMENT
Filed Sept. 11, 1933
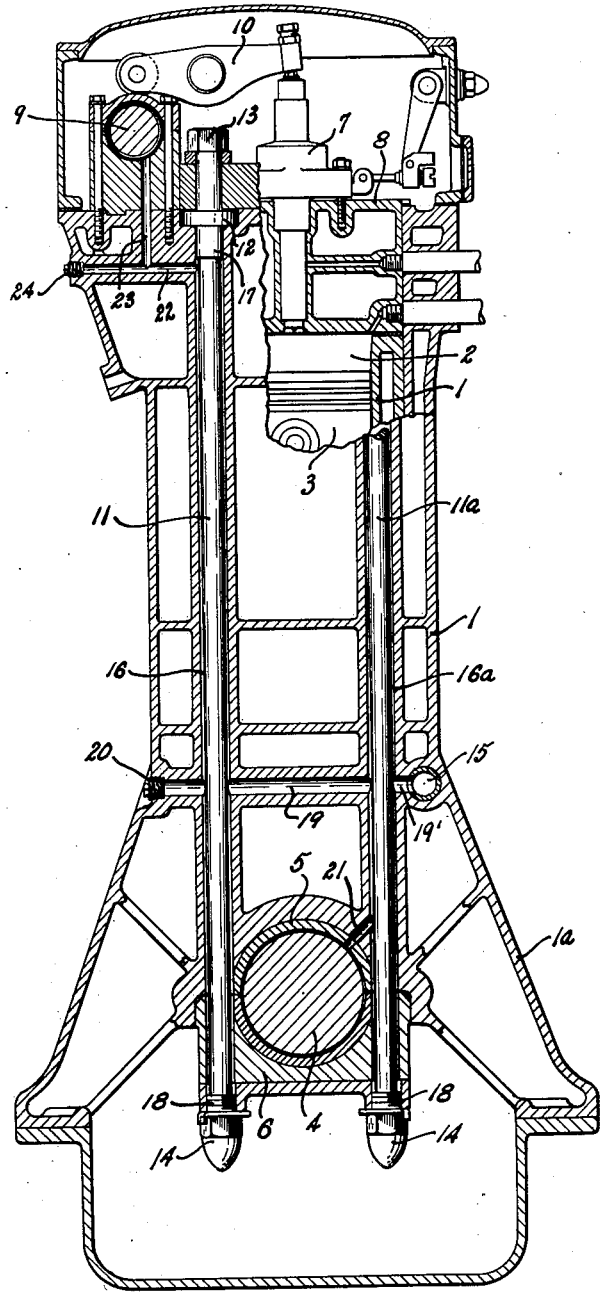
INVENTOR
HAROLD D. CHURCH
BY
Brockett, Hyde, Higley & Meyer
ATTORNEYS Patented Aug. 7, 1934

1,969,690

UNITED STATES PATENT OFFICE 1,969,690

LUBRICATING ARRANGEMENT

Harold D. Church, Cleveland Heights, Ohio, assignor, by mesne assignments, to General Motors Corporation, Detroit, Mich., a corporation of Delaware Application September 11, 1933, Serial No. 688,909

2 Claims. (Cl. 184—6)

This invention relates to lubrication means for internal combustion engines, particularly for large sizes of such engines wherein the main bearings are so short that there is no room for drilled oil passages thereto, as customary in engines of such size.

An object of the invention is to utilize as a part of the lubricant-conducting passageway, the clearance provided between the main-bearing-securing tie-rods and the cylinder block openings in which the rods are disposed.

More particularly, objects are to utilize such clearances for flow transversely from one side of the engine to the other, and flow lengthwise of tie-rods, to main and cam shaft bearings.

The exact nature of this invention together with further objects and advantages thereof will be apparent from the following description taken in connection with the accompanying drawing, which is a sectional elevation of a typical engine in which the invention is embodied, the plane of the section being through a main bearing of the crank shaft, parts being broken away to show the relation of other engine parts.

With reference now to the drawing, 1 is the cylinder block of the engine, having a plurality of cylinder bores 2, each for a piston 3 operatively connected with the crank shaft 4 in the usual manner. The cylinder block is continued at 1a as a frame, to form a crank case about the crank shaft and a crank shaft bearing in the cylinder block, within the crank case, as at 5, a cap 6 completing the bearing. The engine indicated is of the solid fuel injection type, a fuel injection device generally indicated at 7 being mounted in the cylinder head 8, the cylinder head including a bearing for the cam shaft 9 which is part of the gear, including rockers 10, by which the injection devices and valves of the engine are actuated. The assembly of both the bearing cap 6 and cylinder head 8, with the cylinder block, is had by a pair of through bolts or tie-rods 11, 11a. Each rod is disposed in suitable aligned openings in the parts, as illustrated, each rod having a head 12 seating in the recess in the cylinder block, a nut 13 providing bearing against the cylinder head and at its opposite end a nut 14 providing a bearing against the bearing block 6. Thus by removal of the nuts 13, the cylinder head may be removed without disturbing the main bearing, and similarly by removing the nuts 14, the crank shaft may be removed without disturbing the cylinder head.

The engine thus obviously comprises a single principal or main member having integral cylinder block and crankcase parts, and upon which as a base the other engine parts are mounted.

It will be appreciated that the engine illustrated typifies multiple cylinder construction, generally as well known in the art, and it will be appreciated that the crank shaft 4 has a plurality of main bearings such as that illustrated, with cap 6 for each bearing and a pair of tie-rods 11 for each cap, each cylinder 2 being disposed between a pair of main bearings.

The cylinder block is provided with a lubricant supply passage 15 longitudinally extending on one side of the tie-rods, and as shown adjacent the tie-rods 11a. This supply passage 15 is served by a pump so that during operation of the engine it is maintained full of oil under pressure as is the usual practice in the art.

It is necessary that the bearings for the crank shaft 4 and cam shaft 9 receive lubrication from the supply line 15, and according to my invention I utilize for the purpose, the cylinder block openings in which the tie-rods 11 are disposed. More particularly I so relate the tie-rods and their openings as to provide a clearance 16, 16a along each tie-rod. Preferably and as indicated in the drawing, both the rods and their cylinder block openings are circular in section, and the clearances 16 are effected by making the rod diameters slightly less than their openings so that the clearances 16 are annular about the rods and extend therealong. It will be observed that for each rod this clearance 16 is effectively terminated at the head end by the head 12, or by an enlargement 17 by which the rod is centered in its opening. Similarly the crank end is terminated by the seating of the nut 14 when turned upon the thread 18 which serves to center the crank end of the rod.

Leading transversely from the opposite side of the engine to the supply line 15 is a transverse passage 19 drilled in the cylinder block to intersect both rod-receiving openings before the insertion of the rods therein, and closed by the plug 20. This passage 19 thus connects both clearances 16, 16a with the supply line 15, the far clearance 16 by way of the near clearance 16a.

From the clearance 16a about the rod 11a on the side of the engine near the supply line 15, is a lead 21 to the main bearing 5.

From the far clearance 16, adjacent the cylinder head 8, are leads 22 and 23, in the cylinder block and cylinder head, directed to the bearing of the cam shaft 9, a plug 24 closing the end of the lead 22 from which the latter is drilled.

Operation will be as follows. The main bearing 5 of the crank shaft 4 receives lubricant from the supply line 15 by way of the short portion 19' of the transverse passage 19, thence downwardly by way of the clearance 16a, thence through the lead 21.

The cam shaft 9 receives lubricant at its bearing, from the supply line 15 by way of the transverse passage 19, first by way of its short length 19', thence about the tie-rod 11a by way of its annular clearance 16a, thence from the transverse passage 19 upwardly by way of the clearance 16, thence through the leads 22 and 23 successively and to the cam shaft bearing. It will be observed that the cam shaft is on the opposite side of the engine from the supply line 15, yet receives lubricant therefrom. The transfer across the engine of this lubricant is in the very narrow space between cylinders, the only necessary clearance between cylinders being that for the transverse passage 19. Similarly the main bearing 5 being very short but of large diameter, nevertheless receives its lubricant very effectively in the narrow space provided.

As will be appreciated, the other main and camshaft bearings of the engine receive their lubrication from the supply line 15 in a manner identical with that described for the bearings specifically illustrated.

What I claim is:

1. In an engine of the class described and having a main member with cylinder block and crankcase parts, a head for said cylinder block part, a cam shaft bearing adjacent said head, a main bearing in said crankcase part and having a removable cap, said main member, cylinder head, and bearing cap having a pair of aligned openings on opposite sides of said main bearing, tie-rods disposed in said openings to secure said cylinder head and bearing cap upon said main engine member, said tie-rods and their openings being related to provide clearances therealong, said crankcase part having a lubricant supply passage longitudinally extending on one side of said tie-rods, said cam shaft bearing being on the opposite side thereof, said main member having transverse passages extending from said lubricant supply passage to the near tie-rod clearance and between said tie-rod clearances, and having a lead for said cam shaft bearing from the tie-rod clearance adjacent thereto.

2. In an engine of the class described and having a main member with cylinder block and crankcase parts, a head for said cylinder block part, a cam shaft bearing adjacent said head, a main bearing in said crankcase part and having a removable cap, said main member, cylinder head, and bearing cap having a pair of aligned openings on opposite sides of said main bearing, tie-rods disposed in said openings to secure said cylinder head and bearing cap upon said main engine member, said tie-rods and their openings being related to provide clearances therealong, said crankcase part having a lubricant supply passage longitudinally extending on one side of said tie-rods, said cam shaft bearing being on the opposite side thereof, said main member having a transverse passage extending from said lubricant supply passage to the far tie-rod clearance by way of the near tie-rod clearance, having a lead for said main bearing from one of said clearances and a lead for said cam shaft bearing from the other clearance.

HAROLD D. CHURCH.